United States Patent
Iwai (10) Patent No.: US 8,138,910 B2
(45) Date of Patent: Mar. 20, 2012

(54) UNINTERRUPTIBLE POWER SUPPLY UNIT

(75) Inventor: Kazuhiro Iwai, Tokyo (JP)

(73) Assignee: Densei Lambda K.K. (JP)

( * ) Notice: Subject to any disclaimer, the term of this patent is extended or adjusted under 35 U.S.C. 154(b) by 671 days.

(21) Appl. No.: 12/299,251

(22) PCT Filed: Feb. 15, 2008

(86) PCT No.: PCT/JP2008/052563
§ 371 (c)(1),
(2), (4) Date: Oct. 31, 2008

(87) PCT Pub. No.: WO2008/111360
PCT Pub. Date: Sep. 19, 2008

(65) Prior Publication Data
US 2009/0102618 A1 Apr. 23, 2009

(30) Foreign Application Priority Data
Mar. 15, 2007 (JP) .................. 2007-066659

(51) Int. Cl.
*G08B 1/08* (2006.01)
*H04M 11/04* (2006.01)
*H04Q 1/30* (2006.01)

(52) U.S. Cl. ......................... 340/538; 307/66

(58) Field of Classification Search .................. 340/538; 307/43, 51, 64, 66; 320/137
See application file for complete search history.

(56) References Cited

U.S. PATENT DOCUMENTS 6,917,124 B2 * 7/2005 Shetler, Jr. et al. ............. 307/66
7,456,520 B2 * 11/2008 Colombi et al. ................ 307/64

FOREIGN PATENT DOCUMENTS

| JP | 60-158229 U | 3/1984 |
| JP | 60-158229 | 10/1985 |
| JP | 6-140962 | 5/1994 |
| JP | 06-250939 | 9/1994 |
| JP | 2000-236587 | 8/2000 |
| JP | 2003-152764 | 5/2003 |

* cited by examiner

Primary Examiner — John A Tweel, Jr.
(74) Attorney, Agent, or Firm — Stephin Chin (57) ABSTRACT

To allow multiple power line communication (PLC) devices to communicate with one another via power lines without being affected by the power supply state of an uninterruptible power supply unit coupled among the PLC devices. Multiple modem means 32 for transmitting or receiving a PLC signal are installed, each corresponding to a power receiving terminal 2 and one or more power supply terminals 3 in an uninterruptible power supply unit 1 in a one-to-one manner. Multiple low-pass filter circuit 7 and 18 for eliminating a PLC signal are installed to a power line between each of the multiple modem means 32 and a power supply circuit 10. Control means 40 and 41 transmit a PLC signal based on a PLC signal received by one of the multiple modem means 32 from at least one of the other modem means 32.

10 Claims, 5 Drawing Sheets

FIG.1

SHUTDOWN SEQUENCE TABLE (38)

| OUTLET NUMBER | WINK TIME | POWER SUPPLY STOP TIME | PLC NETWORK ADDRESS | REMARKS |
|---|---|---|---|---|
| CT1 | t11(ms) | t12(ms) | ********1 | PLC COMMUNICATION DEVICE DETECTED |
| CT2 | t21(ms) | t22(ms) | B bnk | PLC COMMUNICATION DEVICE UNDETECTED |
| ... | ... | ... | | |
| CTN | tn1(ms) | tn2(ms) | ********2 | PLC COMMUNICATION DEVICE DETECTED |

UNINTERRUPTIBLE POWER SUPPLY UNIT

CROSS REFERENCES TO RELATED APPLICATIONS

This application claims priority to international application number PCT/JP2008/052563 filed on Feb. 15, 2008 which claims priority to Japanese patent application number 2007-066659 filed on Mar. 15, 2007, the entire disclosures of which are hereby incorporated by reference.

TECHNICAL FIELD

The present invention relates to an uninterruptible power supply unit.

RELATED ART

The patent document 1 discloses a system for power line communication (PLC). Building a PLC modem into a uninterruptible power supply unit enables a system to realize power line communication among personal computers (PCs) without building a PLC modem in each PC.

[Patent Document] JP-A-2003-152764 (in particular, description of preferred embodiments, FIGS. 1 and 4, and the like.)

DISCLOSURE OF THE INVENTION

Problems to be Solved by the Invention

An uninterruptible power supply unit supplies a backup power to load devices when a commercial power is interrupted or the quality of commercial power is degraded. During supplying a backup power, in an uninterruptible power supply unit, a power line of the commercial power supply side is separated from a power line coupled to a load device.

On the other hand, power line communication requires that two devices be coupled to each other via a power line so as to communicate each other. If an uninterruptible power supply unit is coupled between such two devices intended to communicate together, a power line between the two devices may be cut off depending on the power supply state of an uninterruptible power supply unit. Thus, the two devices may fail to communicate with each other via the power line. Also, various elements such as a noise filter are coupled to the power line in an uninterruptible power supply unit. Such internal elements may eliminate a PLC signal used for power line communication or break data contained in the signal.

In order to avoid such interruption of communication due to the power supply state of an uninterruptible power supply unit, the patent document 1 proposes setting an uninterruptible power supply unit for applied individual PC in a one-to-one manner and incorporating a PLC modem to the commercial alternating current terminal of each uninterruptible power supply unit so that the PLC modem communicates with a PC in a one-to-one manner.

In the system disclosed in the patent document 1, however, it must be required that an uninterruptible power supply unit be coupled to a PC as a corresponding load device via two cables such as a power cable and a communication cable. The system disclosed in the patent document 1 cannot attain an advantage of power line communication in that no communication cable need be coupled to a PLC device.

Power supply modes of an uninterruptible power supply unit are a constant inverter power supply mode and a constant commercial power supply mode. In a constant inverter power supply mode, a battery is charged by a power supplied to a power receiving terminal, the charged battery used for generating an alternating voltage, and the generated alternating power is supplied to a power supply terminal of a load device. In a constant commercial power supply mode, a power receiving terminal at a commercial alternating current power supply is normally directly coupled to a power supply terminal a load device via a power line. In case of an abnormality of a power supply, a battery is switched to the power supply terminal. In constant commercial power supply mode, such switching causes a momentary power failure in the order of several milliseconds. Uninterruptible power supply units have various operational mode such as only constant commercial power supply mode, a only constant inverter power supply mode, and a mode of switching the above two modes depending on a setting.

An advantage of the present invention is to provide an uninterruptible power supply unit that is coupled among multiple PLC devices and allows these PLC devices to communicate one another via power lines without being affected by the power supply state of the uninterruptible power supply unit.

Means for Solving the Problems

According to an aspect of the present invention, an uninterruptible power supply unit includes: a power supply circuit that generates a predetermined alternating current power from an alternating current power supplied to a power receiving terminal or from a backup power and supplies the generated power to one or more power supply terminals; a plurality of modem means each installed, each corresponding to the power receiving terminal and each of the one or more power supply terminals in a one-to-one manner, that transmits or receives a power line communication (PLC) signal; a plurality of low-pass filter circuits each coupled to a power line between each of the modem means and the power supply circuit, that eliminates the PLC signal; and control means that makes at least one of the other modem means transmit PLC signal based on a PLC signal received by one of the modem means.

According to this aspect, the plurality of modem means and control means allow a PLC signal to be transferred among the power receiving terminal and power supply terminals. For example, PLC devices coupled to the power receiving terminal and PLC devices coupled to the power supply terminals are allowed to transmit or receive a PLC signal to or from one another via the uninterruptible power supply unit. These PLC devices coupled to one another via the uninterruptible power supply unit are allowed to stably communicate with one another via power lines without being affected by whether the power supply circuit is generating the predetermined alternating current power from power supplied to the power receiving terminal or from backup power, that is, without being affected by the power supply state of the uninterruptible power supply unit, these PLC devices are allowed to stably communicate with one another.

Also, the low-pass filter for eliminating a PLC signal is coupled to the power line between each modem means and the power supply unit. Therefore, there is no possibility that a PLC signal transmitted to the power line by a modem means may pass through the uninterruptible power supply unit and leak out from another terminal. Thus, the PLC signal is properly transferred among the power receiving terminal and one or more power supply terminals in the uninterruptible power supply unit.

According to other aspect of the present invention includes: a power supply circuit that charges a battery using an alternating current power supplied to a power receiving terminal, converts a power contained in the battery into a predetermined alternating current power using an inverter circuit, and supplies the converted power to a plurality of power supply terminals; a plurality of modem means each installed corresponding to the power receiving terminal and the power supply terminals in a one-to-one manner, that transmits or receives a power line communication (PLC) signal; a plurality of low-pass filter circuits each coupled to a power line between each of the modem means corresponding to the power supply terminals and the power supply circuit, that eliminates the PLC signal; and control means that makes at least one of the other modem means transmit a PLC signal based on a PLC signal received by one of the modem means.

According to the other aspect, the plurality of modem means and the control means allow a PLC signal to be transferred among the power receiving terminal and power supply terminals. For example, PLC devices coupled to the power receiving terminal and PLC devices coupled to the power supply terminals are allowed to transmit or receive a PLC signal to or from one another via the uninterruptible power supply unit. Also, the PLC devices coupled to different power supply terminals are allowed to transmit or receive a PLC signal to or from one another via the uninterruptible power supply unit. Thus, these PLC devices are allowed to stably communicate with one another via power lines without being affected by the power supply state of the uninterruptible power supply unit.

Also, the power supply circuit (battery, etc.) for constant inverter power supply is coupled between the modem means corresponding to the power receiving terminal and the plurality of power supply terminals in the uninterruptible power supply unit. Further, the low-pass filter for eliminating a PLC signal is coupled to the power line between the modem means corresponding to each power supply terminal and the power supply circuit. Therefore, there is no possibility that a PLC signal transmitted to the power line by any of the modem means may pass through the uninterruptible power supply unit and leak out from another terminal. Thus, the PLC signal is transferred among the power receiving terminal and the plurality of power supply terminals in the uninterruptible power supply unit.

In addition to the above-described aspects of the invention, the uninterruptible power supply unit has the following features. Each of the modem means demodulates a received PLC signal to communication data, and modulates the demodulated communication data in a PLC signal and transmits the modulated PLC signal. The control means supplies communication data demodulated by the modem means to the modem means other than the modem means that has demodulated the communication data.

According to the above additional feature of the aspect, the control means transfers the received PLC signal via another modem means. Thus, the control means transfers the PLC signal in a transparent manner.

In addition to the above-described aspects of the invention, the uninterruptible power supply unit has the following features. The system includes a routing table for storing a network address of a PLC device coupled to the uninterruptible power supply unit. Each of the modem means demodulates a received PLC signal to communication data, and modulates the demodulated communication data to a PLC signal and transmits the modulated PLC signal. The control means determines a destination of communication data demodulated by the modem means using the routing table and supplies the demodulated each communication data to the modem means corresponding to the destination so that the communication data is transmitted from the modem means corresponding to the destination.

According to this additional feature of the aspect, the control means determines the destination of the received PLC signal and transfers the PLC signal via another modem means corresponding to the determined destination. Thus, the control means determines the destination of the received communication data and properly performs the routing process of the communication data.

In addition to the above-described aspects of the invention, the uninterruptible power supply unit has the following features. The system further includes: detection means that detects a PLC device coupled to each of the power supply terminals so as to make a notice of shutdown; and a shutdown sequence table being used to make a notice of shutdown and storing a network address of the PLC device detected by the detection means. Each of the modem means demodulates a received PLC signal to communication data, and modulates demodulated communication data to a PLC signal and transmits the modulated PLC signal. The control means determines a destination of communication data demodulated by the modem means using the shutdown sequence table. The communication data of which a destination is a network address registered in the shutdown sequence table is transmitted from the modem means corresponding to the determined destination. The communication data of which destination is a network address not registered in the shutdown sequence table is transmitted by the modem means corresponding to the power receiving terminal unless the communication data has been received by the power receiving terminal.

According to this additional feature of the aspect, the control means uses the shutdown sequence table used to make a notice of shutdown as a routing table and thus properly performs the routing process. As a result, the control means determines the destination of the received PLC signal without having to create a dedicated routing table and transfers the PLC signal via another modem means corresponding to the determined destination.

In addition to the above-described aspects of the invention, the uninterruptible power supply unit according to the invention has the following features. After a notice of shutdown has been made according to the shutdown sequence table, the control means transmits no PLC signal from the modem means corresponding to the power supply terminals from which the notice has been made.

According to this additional aspect, a PLC signal is no longer transmitted to any PLC device undergoing a shutdown process. Hence the structure can avoid useless consumption of backup power caused by transmitting a PLC signal to a PLC device undergoing a shutdown process.

In addition to the above-described aspects of the invention, the uninterruptible power supply unit has the following features. The shutdown sequence table includes a record corresponding to each of the power supply terminals. A network address of the PLC device is registered in the shutdown sequence table in a manner that the network address is categorized into the record according to each coupling. Even if the communication data is multi-cast data whose destination is not specified, the control means does not make the modem means corresponding to the power supply terminals transmit the communication data. The power supply terminals have the record of the shutdown sequence table in which no network address is registered.

According to this additional aspect, if a device other than a PLC device, such as an electronic device, is coupled to a power supply terminal, high-quality power on which no PLC signal is superimposed is supplied to the electronic device. Thus, the electronic device, which may be malfunctioned by a PLC signal, is allowed to be coupled to the power system for power line communication.

In addition to the above-described aspects of the invention, the uninterruptible power supply unit has the following feature. The control means and the plurality of modem means operate while being backed up by a battery inside the uninterruptible power supply unit.

According to this additional aspect, the control means and the plurality of modem means operate and transmit or receive a PLC signal when a backup power is supplied, for example, at the time of a power failure.

In addition to the above-described aspects of the invention, the uninterruptible power supply unit has the following features. A surge absorber circuit is coupled between the power receiving terminal and the power supply circuit. The surge absorber circuit eliminates an abnormal high-voltage component momentarily caused by a lighting strike from an alternating current voltage input into the power receiving terminal. The modem means corresponding to the power receiving terminal transmits or receives a PLC signal between the surge absorber circuit and the power supply circuit.

According to this additional aspect, the modem means corresponding to the power receiving terminal is coupled to a power line located downstream of the surge absorber circuit in the power supply direction so that the modem means is protected by the surge absorber circuit. Also, because no PLC signal is eliminated by the surge absorber circuit, this modem means can transmit or receive a PLC signal to or from other PLC devices via the surge absorber circuit.

Advantage of the Invention

The invention enables an uninterruptible power supply unit to be coupled among multiple PLC devices, as well as the multiple PLC devices to communicate with one another via power lines without being affected by the power supply state of the uninterruptible power supply unit.

REFERENCE NUMERALS

1: uninterruptible power supply unit
2: power receiving terminal
3: power supply terminal
4: surge absorber circuit
7, 18: LPF circuit (low-pass filter circuit)
10: power supply unit (power supply circuit)
13: battery
14: inverter circuit
32: PLC modem device (modem means)
38: shutdown sequence table
39: power supply controller (detection means)
40: PLC receiver (part of control means)
41: PLC transmitter (part of control means)
51: record corresponding to power supply terminal
67: first UPS (uninterruptible power supply unit)
68: second UPS (uninterruptible power supply unit)
69: first PC (PLC device)
71: second PC (PLC device)
73: third PC (PLC device)
75: fourth PC (PLC device)
78: fifth PC (PLC device)

DESCRIPTION OF THE PREFERRED EMBODIMENT

An uninterruptible power supply unit according to an exemplary embodiment of the present invention will now be described with reference to the accompanying drawings.

Figure 1:
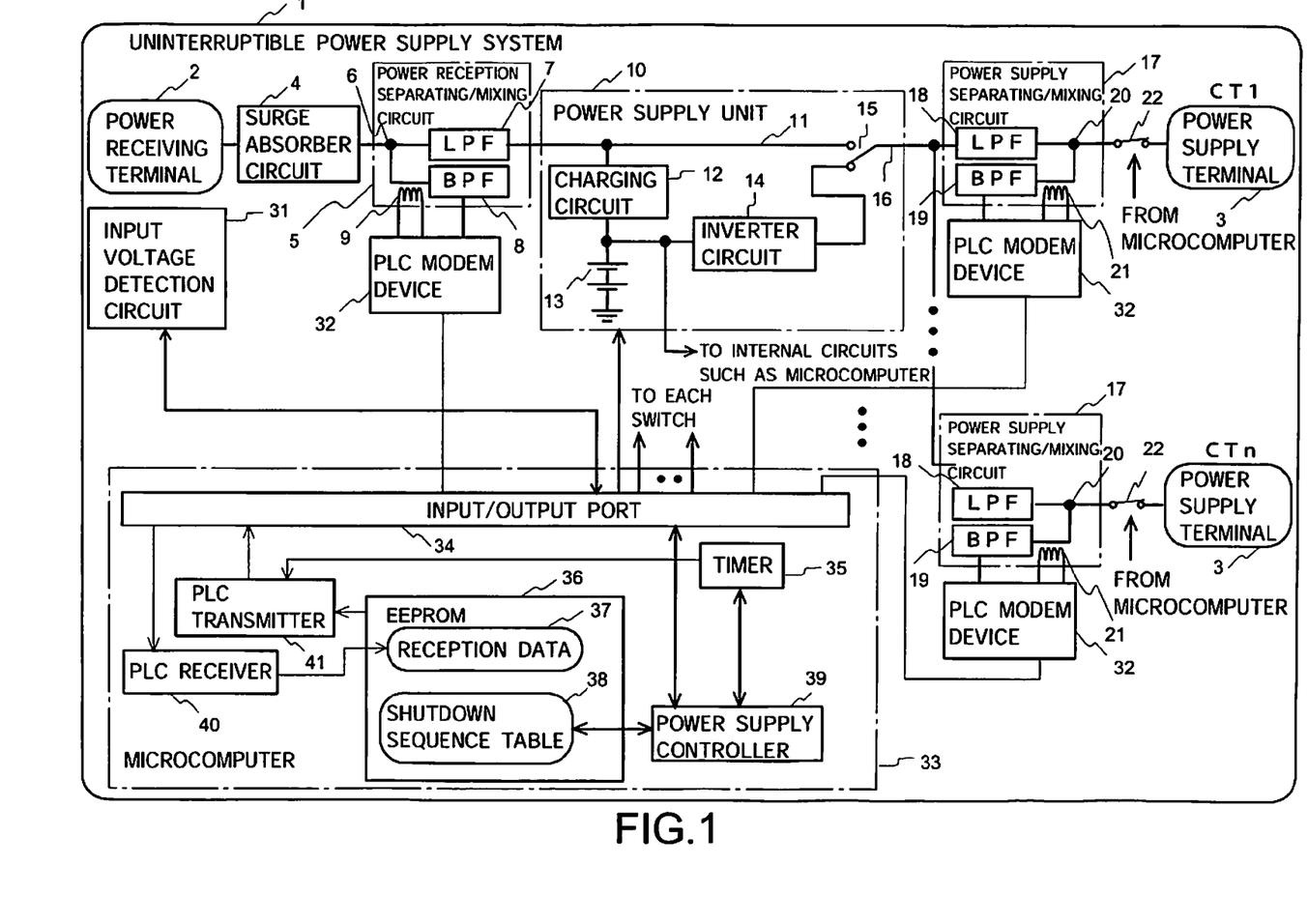
FIG. 1 is a block diagram showing a structure of an uninterruptible power supply unit according to an exemplary embodiment of the present invention.

FIG. 1 is a block diagram showing a structure of the uninterruptible power supply unit 1 according to the exemplary embodiment. An uninterruptible power supply unit 1 includes a single power receiving terminal 2 and multiple power supply terminals 3. The uninterruptible power supply unit 1 transfers PLC signals between the single power receiving terminal 2 and multiple power supply terminals 3.

The power receiving terminal 2 is directly coupled to a wall outlet or the like inside a building so as to receive an alternating current power such as a commercial use, to be described later, for example. The power receiving terminal 2 receives a power with an alternating current voltage at a predetermined frequency of, e.g., 50 Hz from the commercial alternating power supply. The power supply terminals 3 are coupled to an electronic apparatus or the like such as a personal computer or a digital versatile disk (DVD) player with a programmed recording function as a load device. The uninterruptible power supply unit 1 may include a single power supply terminal 3.

The power receiving terminal 2 is coupled to a surge absorber circuit 4 inside the uninterruptible power supply 1. For example, the surge absorber circuit 4 eliminates an abnormal high-voltage component that is instantaneously caused by a lighting strike or the like from an alternating current voltage input to the power receiving terminal 2. Thus, such an abnormal high-voltage is no longer supplied to circuits (e.g., a power supply unit 10 to be described later, etc.) located downstream of the surge absorber circuit 4 in the power supply direction inside the uninterruptible power supply unit 1. As a result, these downstream circuits are less likely to be damaged.

The surge absorber circuit 4 is coupled to a power reception separating/mixing circuit 5. For example, the power reception separating/mixing circuit 5 branches a power line coupled to the surge absorber circuit 4 into two lines at a separating/mixing point 6. Coupled to one of the branched power lines is a low-pass filter (LPF) circuit 7. Coupled to the other branched power line is a band-pass filter (BPF) circuit 8. The LPF circuit 7 interrupts a PLC signal; the BPF circuit 8 transmits a PLC signal through. A coil 9 is installed on one of the branched power lines between the separating/mixing point 6 and BPF circuit 8 for superimposing (inputting) a PLC signal on the power line.

The LPF circuit 7 of the power reception separating/mixing circuit 5 is coupled to the power supply unit 10 serving as a power supply circuit. The power supply unit 10 includes an input power line 11 coupled to the LPF circuit 7 of the power reception separating/mixing circuit 5, a charging circuit 12 coupled to the input power line 11, a battery 13 coupled to the charging circuit 12, an inverter circuit 14 coupled to the battery 13, and a two-input selector 15 for selecting one of the input power line 11 and inverter circuit 14 and coupling the selected one to an output power line 16.

The charging circuit 12 generates power for charging the battery 13 from a power with an alternating voltage output from the LPF circuit 7. In order to charge the battery 13, the charging circuit 12 generates, for example, an alternating current voltage having a frequency higher than that of an alternating current voltage output from the LPF circuit 7 or generates a power with a direct current voltage higher than the voltage of electricity accumulated in the battery 13. The charging circuit 12 charges the battery 13 using a charging power with the generated voltage.

The inverter circuit 14 generates an alternating current voltage having a predetermined quality to be supplied to the power supply terminals 3, from a direct current voltage stored in the battery 13. An alternating current voltage generated by the inverter circuit 14 is preferably of a high quality, for example, equivalent to a quality of which a commercial alternating current voltage is required to be.

The power supply unit 10 operates in constant inverter power supply mode if the two-input selector 15 selects the inverter circuit 14 according to a control signal from the power supply controller 39 to be described later; it operates in commercial mode if the two-input selector 15 selects the input power line 11 according to a control signal from the power supply controller 39. FIG. 1 shows a state in which the power supply unit 10 is operating in constant inverter power supply mode.

The output power line 16 of the power supply unit 10 is coupled to multiple power supply separating/mixing circuits 17 of which numbers are identical to the power supply terminals 3. The power supply separating/mixing circuits 17 each include an LPF circuit 18 coupled to the output power line 16 and a BPF circuit 19. The outputs of these circuits are coupled to a power line at a separating/mixing point 20. Similarly to the power reception separating/mixing circuit 5, the LPF circuit 18 interrupts a PLC signal and the BPF circuit 19 transmits a PLC signal through. A coil 21 is installed on a power line between the separating/mixing point 20 and BPF circuit 19 for superimposing (inputting) a PLC signal on the power line.

The separating/mixing point 20 of each power supply separating/mixing circuits 17 is coupled to one of the power supply terminals 3 via an open/close switch 22. Multiple power supply terminals 3 may be coupled to a single open/close switch 22. Each open/close switch 22 is normally kept closed according to a control signal from the power supply controller 39 to be described later. But it is opened when a power supply to a load device coupled to the power supply terminal 3 is stopped.

According to the above-described structure, the uninterruptible power supply unit 1 supplies a power supplied to the power receiving terminal 2, to the power supply terminals 3 via the surge absorber circuit 4, the power reception separating/mixing circuit 5, the power supply unit 10, the power supply separating/mixing circuits 17 and the open/close switches 22, and further supplies the power to load devices coupled to the power supply terminals 3. Also, when facing a power failure or the like, the uninterruptible power supply unit 1 causes the inverter circuit 14 to generate an alternating current voltage with a predetermined frequency using a backup power stored in the battery 13, and then supplies the generated backup power to the load devices coupled to the power supply terminals 3.

The uninterruptible power supply unit 1 also includes, as its internal circuits, an input voltage detection circuit 31, multiple PLC modem devices 32 as modem means, a microcomputer 33 to which these components are coupled, and the like. These internal circuits receive power accumulated in the battery 13, so that these internal circuits operate even during a power failure. Or these internal circuits may receive a power from another backup power supply such as a battery during a power failure.

The input voltage detection circuit 31 detects an instantaneous voltage of a power supplied to the power receiving terminal 2 and supplies a detection signal including information on the level of the detected instantaneous voltage, to the microcomputer 33.

The numbers of the PLC modem devices 32 ((n+1) in FIG. 1), for example, are identical to the sum of the number of the power receiving terminal 2 and the number of the multiple power supply terminals 3 so that each of these devices corresponds to each of these terminals in a one-to-one manner. The PLC modem devices 32 are coupled to the microcomputer 33. The PLC modem devices 32 detect a PLC signal superimposed on the power line at the output of the BPF circuit 8 of the power reception separating/mixing circuit 5 or the BPF circuit 19 of the power supply separating/mixing circuit 17, and demodulate the modulated PLC signal to communication data. The PLC modem devices 32 superimpose a PLC signal modulated from communication data on the power line using, for example, the coil 9 of the power reception separating/mixing circuit 5 or the coil 21 of the power supply separating/mixing circuit 17.

Each PLC modem devices 32 stores an individual unique network address. For example, a media access control (MAC) address, an Internet protocol (IP) address, or the like is used as the network address of each PLC modem device 32.

The microcomputer 33 includes an input/output port 34, a timer 35, an electrically erasable programmable read only memory (EEPROM) 36, a central processing unit (CPU) (not shown), and the like. The EEPROM 36 stores reception data 37, a shutdown sequence table 38, a program (not shown), and the like. The CPU reads and executes the program stored in the EEPROM 36. Thus, in the microcomputer 33, the power supply controller 39 serves as a detection means, a PLC receiver 40 serves as a part of a control means, and a PLC transmitter 41 serves as a part of the controller.

The program stored in the EEPROM 36 may be stored in a memory such as the EEPROM 36 prior to shipment of the uninterruptible power supply unit 1 or may be stored in a memory such as the EEPROM 36 after shipment thereof. Or a part of the program may be stored in a memory such as the EEPROM 36 after shipment thereof. If the program is stored in a memory such as the EEPROM 36 after shipment thereof, the program stored in a computer-readable recording medium such as a compact disc read only memory (CD-ROM) may be installed or the program downloaded from a server or the like via a transmission medium such as the Internet may be installed.

All or part of the reception data 37, shutdown sequence table 38, program (not shown), and the like may be stored in a memory serving as a substitute for the EEPROM 36 in the microcomputer 33 or in a mass storage device outside the microcomputer 33, such as a detachable semiconductor memory or a hard disk drive (HDD).

The input/output port 34 is coupled to the input voltage detection circuit 31, the two-input selector 15 of the power supply unit 10, the multiple open/close switches 22, the multiple PLC modem devices 32, and the like. A detection signal having an instantaneous input voltage level detected by the input voltage detection circuit 31 or communication data received by any PLC modem device 32 is supplied to the microcomputer 33 via the input/output port 34. A control signal or communication data created in the microcomputer 33 is supplied to the two-input selector 15, multiple open/close switches 22, and multiple PLC modem devices 32 via the input/output port 34.

The timer 35 measures a time of day, backup power supply time, and the like. The backup power supply time refers to a time period (or measurement time period equivalent to that time period) during which the uninterruptible power supply unit 1 is supplying a backup power in the battery 13 to load devices.

The power supply controller 39 controls power supplies to multiple load devices coupled to the multiple power supply terminals 3. For example, the power supply controller 39 creates a control signal for causing the two-input selector 15 to select the inverter circuit 14 according to a setting of constant inverter power supply mode or creates a control signal for causing the two-input selector 15 to select the input power line 11 according to a setting of commercial mode. Also, if the power supply controller 39 determines that a power failure has occurred or determines that the power quality of an input voltage has degraded down to a predetermined level or less, according to an instantaneous input voltage level detection signal when the power supply mode is set to constant commercial mode, the power supply controller 39 creates a control signal for causing the two-input selector 15 to select the inverter circuit 14. Subsequently, when a predetermined backup power supply time (hereafter referred to as a "power supply stop time") has elapsed, the power supply controller 39 creates a control signal for opening the open/close switches 22. These control signals are supplied to the two-input selector 15 and multiple open/close switches 22 via the input/output port 34.

Figure 2:
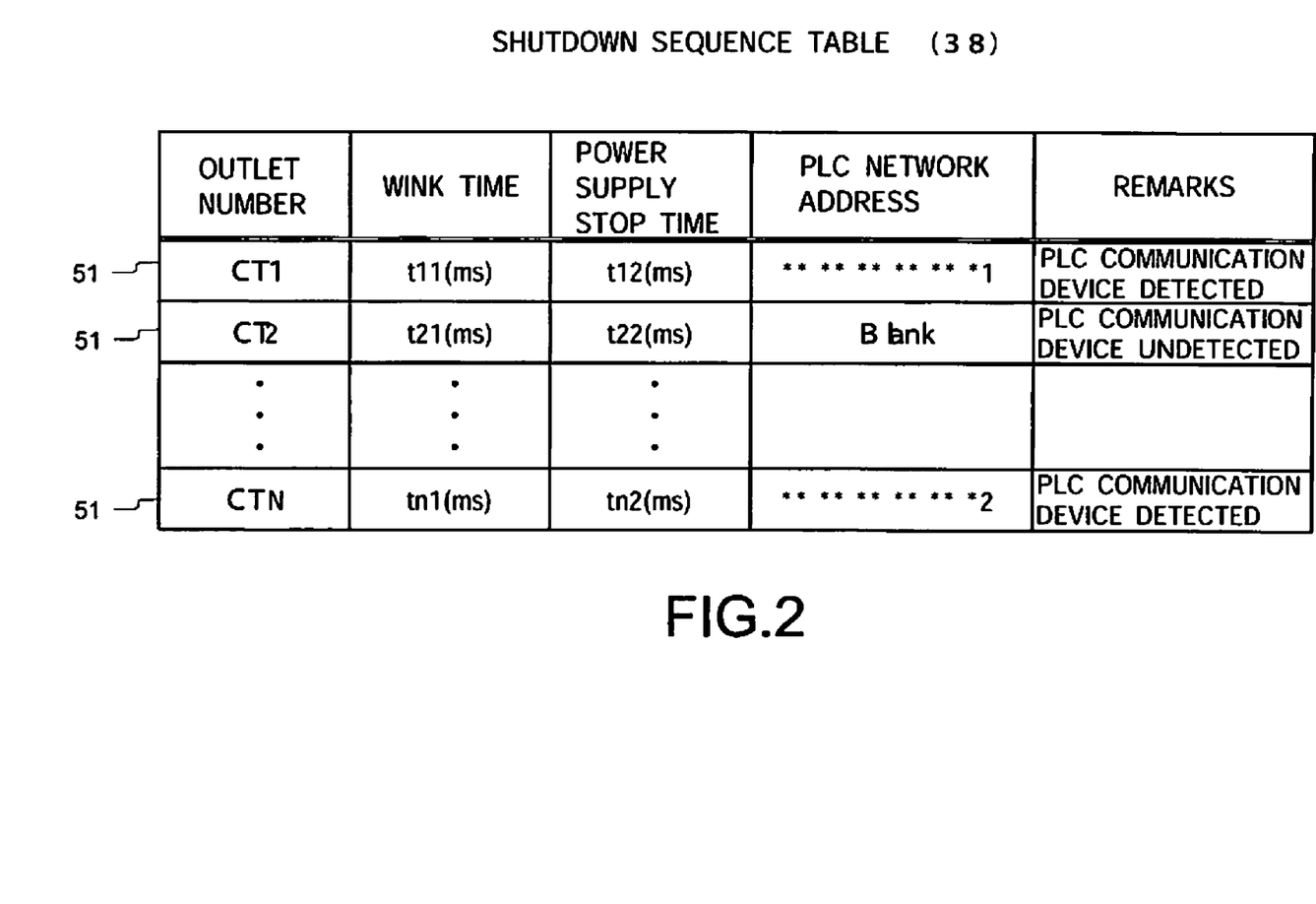
FIG. 2 is a drawing showing one example of a data structure of a shutdown sequence table shown in FIG. 1.

FIG. 2 is a table showing one example of a data structure of the shutdown sequence table 38 shown in FIG. 1. According to the shutdown sequence table 38, the power supply controller 39 controls a power supply to each load device using the corresponding open/close switch 22. For this reason, the shutdown sequence table 38 includes multiple records 51 respectively corresponding to the open/close switches 22. The number of the open/close switches 22 typically matches the number of the power supply terminals 3. In this case, the shutdown sequence table 38 includes multiple records 51 respectively corresponding to the power supply terminals 3.

The record 51 corresponding to each open/close switch 22 includes information, such as an outlet number, a wink time, and a power supply stop time, to be used when performing power supply control using each open/close switch 22. The outlet number refers to a unique number assigned to each open/close switch 22. For example, a outlet number "CT1" is assigned to the power supply terminal 3 on the highest row in FIG. 1 and a outlet number "CTn (n is an integer)" is assigned to the power supply terminal 3 on the lowest row in FIG. 1.

The wink time is a period from the time when the uninterruptible power supply unit 1 starts a backup power supply until the time when it makes a notice of shutdown to each load device. When backup power supply is started, the power supply controller 39 instructs the timer 35 to start measuring the backup power supply time. Subsequently, when the timer 35 has measured the wink time, the power supply controller 39 makes a notice of shutdown to the load devices such as personal computers, using communication means such as the PLC modem devices 32. According to this notice, the load devices like personal computers complete a predetermined termination process (evacuation process) or automatically terminate.

The power supply stop time is a period from the time when the uninterruptible power supply unit 1 starts a backup power supply until the time when it terminates the power supply to the load devices. When the timer 35 has measured this power supply stop time, the power supply controller 39 creates a control signal for opening the open/close 22. The power supply stop time is set to time longer than the wink time in each record 51. Thus, the load devices such as personal computers safely complete a predetermined shutdown process such as a termination process (evacuation process) before the power supply is terminated.

In actual control, if input power is restored after starting a backup power supply and before the wink time, the power supply controller 39 causes the timer 35 to stop measuring the backup power supply time and, if necessary, creates a control signal for causing the two-input selector 15 to select the input power line 11 so as to terminate the backup power supply. Thus, if power is restored within a time period shorter than the wink time, the uninterruptible power supply unit 1 is restored to its normal power supply state without terminating power supply to the load devices.

Also, if an input power is restored in a period between the wink time and the power supply stop time, the power supply controller 39 makes a notice of restart to the load devices using communication means such as the PLC modem devices 32 without having to create a control signal for opening the open/close switch 22 after the elapse of the power supply stop time. Thus, the load devices are restored to their operational state, spending a necessary minimum stop time period.

Further, for example, when any power supply stop time has elapsed, the power supply controller 39 creates a control signal for opening the corresponding open/close switch 22. Subsequently, when input power is restored, the power supply controller 39 makes a notice of restart to the corresponding load device using communication means such as the PLC modem device 32. Thus, the influence of a power failure is eliminated to the extent that the battery 13 is not over-discharged. Also, the load devices are terminated safely and then restored.

The record 51 corresponding to each open/close switch 22 in the shutdown sequence table shown in FIG. 2 includes information of the network address of a PLC device coupled to the corresponding power supply terminal 3 in order to transfer a PLC signal among the power receiving terminal 2 and multiple power supply terminals 3. The PLC device refers to, for example, a personal computer having a power line communication function, and the like. If no PLC device is coupled to a power supply terminal 3, information indicating "blank" is stored as network address information. If multiple PLC devices are coupled to one power supply terminal 3, the respective addressees of the multiple PLC devices are stored in network address information.

When the PLC receiver 40 shown in FIG. 1 receives communication data from any PLC modem device 32 via the input/output port 34 of the microcomputer 33, it stores the data as the reception data 37 in the EEPROM 36.

The PLC transmitter 41 determines the transfer destination of the reception data 37 stored in the EEPROM 36 using the shutdown sequence table 38. Then the PLC transmitter 41 supplies the reception data 37 to the PLC modem device 32 leading to the determined transfer destination via the input/output port 34.

Operations of the uninterruptible power supply unit 1 having the above-described structure for power line communication will now be described.

Figure 3:
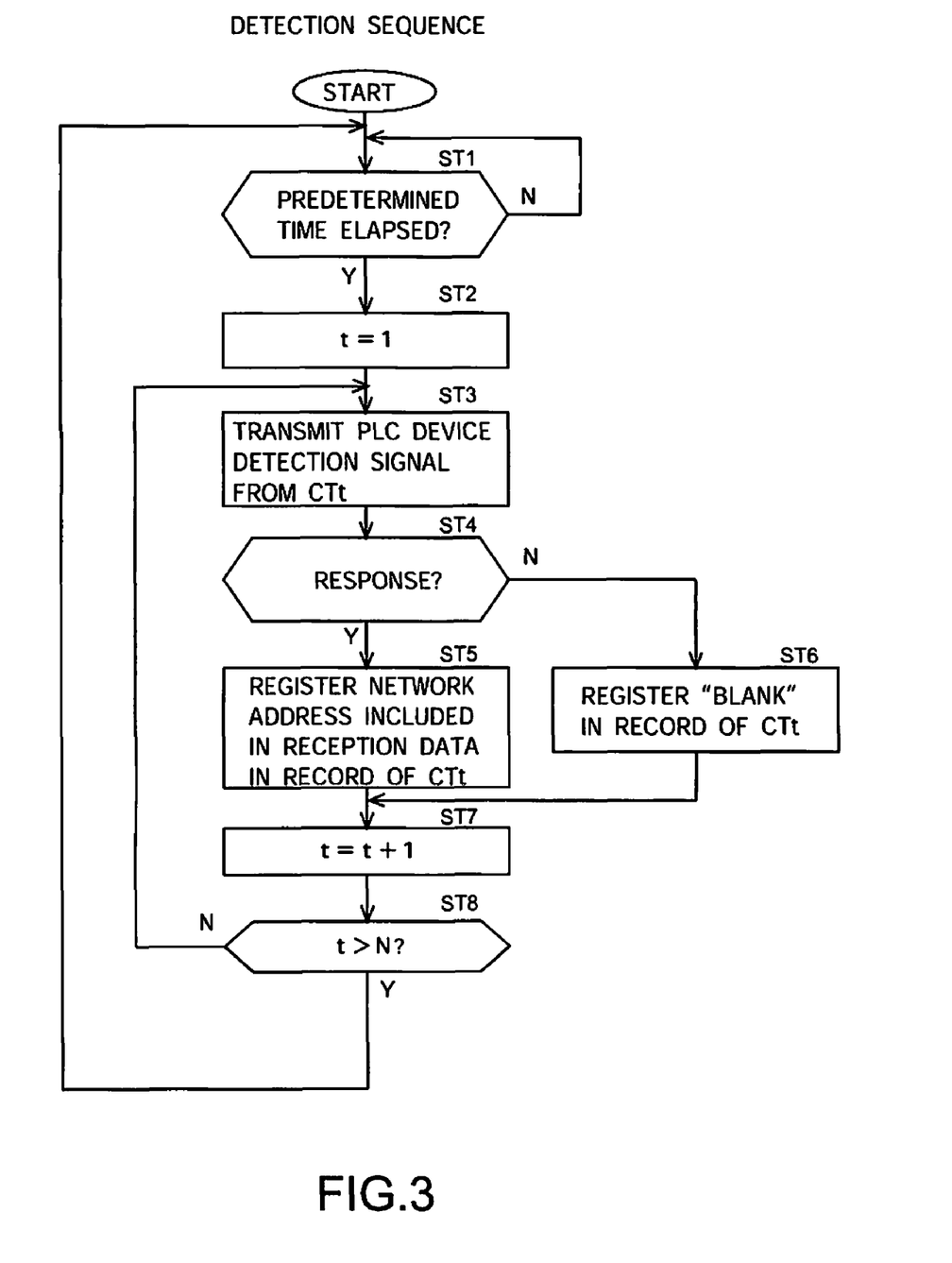
FIG. 3 is a flowchart showing one example of a PLC device detection process performed by the uninterruptible power supply unit.

FIG. 3 is a flowchart showing one example of a PLC device detection process performed by the uninterruptible power supply unit 1. According to this flowchart, the power supply controller 39 of the uninterruptible power supply unit 1 detects PLC devices coupled to the multiple power supply terminal 3 during each predetermined time period.

First, when the power supply controller 39 of the uninterruptible power supply unit 1 determines that the predetermined time period has elapsed, according to time of day measured by the timer 35 (step ST1) for example, it substitutes an initial value "1" for a loop control variable t (step ST2). Subsequently, the power supply controller 39 creates communication data for detection and supplies the created data to the PLC modem device 32 corresponding to the power supply terminal 3 having CTt (in this case, CT1). This communication data for detection is supplied to the PLC modem device 32 corresponding to the power supply terminal 3 having CTt (in this case, CT1) via the input/output port 34. The PLC modem device 32 (not shown) modulates the communication data for detection to a multi-cast PLC signal whose destination is not specified and superimposes (inputs) the PLC signal on the power line using the coil 9 of the power reception separating/mixing circuit 5 (step ST2).

If the microcomputer 33 or the like including the PLC modem device 32 (not shown) is coupled to the power supply terminal 3 having CT1, the PLC modem device 32 of the microcomputer 33 receives this multi-cast PLC signal from the power line and demodulates the PLC signal, which has been modulated, into communication data for detection. Then, the PLC modem device 32 determines that the communication data is communication data for detecting a PLC device and creates a PLC signal for making a notice of its own network address and superimposes (inputs) the PLC signal on the power line. The PLC modem device 32 corresponding to the power supply terminal 3 having CTt (in this case, CT1) receives this PLC signal for making a notice of the network address and obtains the network address by performing a demodulation process. The PLC modem device 32 corresponding to the power supply terminal 3 having CTt (in this case, CT1) supplies the obtained network address to the power supply controller 39 via the input/output port 34.

After the power supply controller 39 has supplied the communication data for detection to the PLC modem device 32 corresponding to the power supply terminal 3 having CTt (in this case, CT1), the power supply controller 39 determines whether there has been a response (step ST4). If the power supply controller 39 has received a network address from the PLC modem device 32, it determines that there has been a response; if the power supply controller 39 has received no network address during the predetermined time period, it determines that there has been no response.

If the power supply controller 39 has received a response from the PLC modem device 32 having caused to transmit the communication data for detection, the power supply controller 39 registers the received network address in the shutdown sequence table 38 (step ST5). Thus, the network address of the PLC device coupled to the power supply terminal 3 having CTt (in this case, CT1) is registered in the record 51 corresponding to CTt (in this case, CT1) in the shutdown sequence table 38 shown in FIG. 2. Also, if the power supply controller 39 receives information on the wink time and information on the power supply stop time as well as information on the network address, it registers the information in the shutdown sequence table 38.

If the power supply controller 39 has received no response from the PLC modem device 32 having caused to transmit the communication data for detection, the power supply controller 39 registers "blank" in the record 51 corresponding to CTt (in this case, CT1) in the shutdown sequence table 38 (step ST6).

After the power supply controller 39 has registered the network address or the like according to the presence or absence of a response, it adds "1" to the loop control variable t (step ST7). Subsequently, the power supply controller 39 determines whether the loop control variable t has exceeded the number N (N is an integer) of outlet numbers (step ST8).

If the loop control variable t has not exceeded the number N (N is an integer) of outlet numbers ("NO" in step ST8), the power supply controller 39 continues to perform the above-described PLC device detection process (steps ST3 to ST7) for each power supply terminal 3 using the new loop control variable t.

If the loop control variable t has exceeded the number N (N is an integer) of outlet numbers ("YES" in step ST8), the power supply controller 39 terminates detecting the PLC device. After that, each time the timer 35 has measured the predetermined time in step ST1 for example, the power supply controller 39 repeatedly detects the PLC device (steps ST2 to ST8).

When the above-described process is completed once, shown in FIG. 2, the network addresses of all PLC devices coupled to the multiple power supply terminals 3 of the uninterruptible power supply unit 1 at that time are registered in the shutdown sequence table 38. "Blank" information indicating that no PLC device is coupled, instead of a network address, is registered in the record 51 (record 51 corresponding to CT 2 in FIG. 2) corresponding to the outlet number of the power supply terminal 3 to which no PLC device is coupled.

Otherwise, when the uninterruptible power supply unit 1 is activated or when the power supply controller 39 detects starting a power supply from each power supply terminal 3, the power supply controller 39 may detect the PLC device so as to register the network addresses of the PLC devices in the shutdown sequence table 38. Or, the network addresses of the PLC devices may be previously registered in the shutdown sequence table 38 by the power supply controller 39 in a previous registration process performed by a user or the like.

Figure 4:
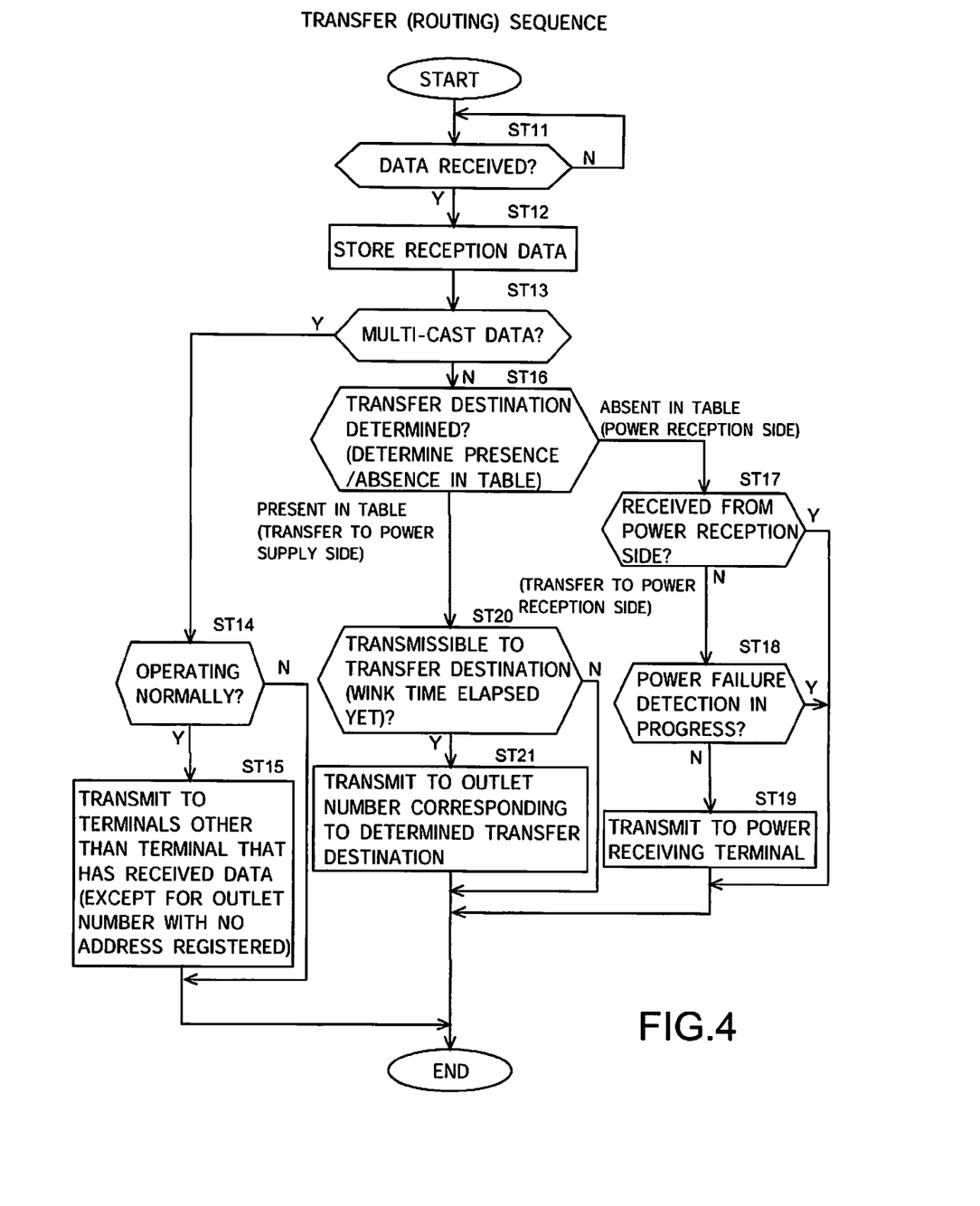
FIG. 4 is a flowchart showing one example of a PLC signal transfer process (routing process) performed by the uninterruptible power supply unit.

FIG. 4 is a flowchart showing one example of a transfer process (routing process) performed by the uninterruptible power supply unit 1.

Each PLC modem device 32 of the uninterruptible power supply unit 1 detects a PLC signal superimposed on the power line when the BPF circuit produces an output, and demodulates the PLC signal, which has been modulated, into communication data. Then, the PLC modem device 32 supplies the demodulated communication data to the input/output port 34 of the microcomputer 33.

When the communication data has been supplied to the input/output port 34 of the microcomputer 33, the PLC receiver 40 of the uninterruptible power supply unit 1 determines that there has been the reception data 37 ("YES" in step ST11) and stores the communication data in the EEPROM 36 (step ST12). Thus, the communication data is stored as the reception data 37 in the EEPROM 36. Here, the reception data 37, which the PLC receiver 40 lets the EEPROM 36 memorize, is assumed to include information such as a network address for specifying the destination of the communication data.

When the new reception data 37 that has yet to be transferred is stored in the EEPROM 36, the PLC transmitter 41 of the uninterruptible power supply unit 1 determines whether the reception data 37 is multi-cast data whose destination is not specified or not (step ST13).

If the reception data 37 stored in the EEPROM 36 is multi-cast data ("YES" in step ST13), the PLC transmitter 41 determines whether the power system is in a normal state (step ST14). Specifically, if the timer 35 is not measuring time for a backup power supply, the transmitter 41 may determine that the power system is in a normal state; if the timer 35 is measuring time for a backup power supply, the transmitter 41 may determine that the power system is not in a normal state. Or, for example, the PLC transmitter 41 may determine whether the power system is in a normal state or not, according to whether input power is in an abnormal state or whether the power supply controller 39 is providing a backup power.

If the PLC transmitter 41 determines that the power system is in a normal state ("YES" in step ST14), it reads the reception data 37 from the EEPROM 36 and supplies the read reception data 37 to all PLC modem devices 32 other than the PLC modem device 32 that has received the reception data 37 stored in the EEPROM 36. This all PLC modem devices 32 are coupled to the power supply terminals 3, and network addresses of the PLC modem devices 32 to which are registered in the shutdown sequence table 38 shown in FIG. 2. Upon receipt of the reception data 37, the PLC modem devices 32 modulate the reception data 37 to a multi-cast PLC signal whose destination is not specified and superimposes (inputs) the PLC signal on the power line (step ST15).

If the PLC transmitter 41 determines that the power system is not in a normal state ("NO" in step ST14), it terminates the transfer process without providing a specific instruction for transmitting the reception data 37. Or, if the PLC transmitter 41 determines that the power system is not in a normal state, it may continue to determine whether the power system is in a normal state or not, and when the power system is restored to its normal state, the PLC transmitter 41 may provide an instruction for transmitting the reception data 37.

Thus, if the uninterruptible power supply unit 1 receives a multi-cast PLC signal at the power receiving terminal 2 when the power is in a normal state, the received PLC signal is transferred as a multi-cast PLC signal via all the power supply terminals 3 to which PLC devices are coupled. Also, if the uninterruptible power supply unit 1 receives a multi-cast PLC signal in one of the power supply terminals 3 when the power system is in a normal state, the received PLC signal is transferred as a multi-cast PLC signal via all the power supply terminals 3 to PLC devices are coupled, other than the power supply terminal 3 that has received the PLC signal, and via the power supply terminal 3.

A case ("NO" in step ST13) where the reception data 37 stored in the EEPROM 36 is not multi-cast data will now be described. The reception data 37 in this case is data such as unicast data whose destination is specified. For this reason, the PLC transmitter 41 starts determining a transfer destination.

During the transfer destination determination process, the PLC transmitter 41 first determines the transfer destination using the shutdown sequence table 38 shown in FIG. 2 for use in power supply control (step ST16). Specifically, the PLC transmitter 41 determines whether the network address of the destination specified in the reception data 37 is registered in the shutdown sequence table 38 or not.

If the network address of the destination is not registered in the shutdown sequence table 38 ("ABSENT IN TABLE" in step ST16), the reception data 37 is not transferred at least to the PLC devices coupled to the power supply terminals 3. In this case, the PLC transmitter 41 also determines whether the reception data 37 is data received by the power receiving terminal 2 or not (step ST17). If the reception data 37 is received by the power receiving terminal 2 ("YES" in step ST17), its unicast data is to be transmitted to a PLC device that is not coupled to the uninterruptible power supply unit 1. In this case, the PLC transmitter 41 terminates the transfer process without providing a specific instruction for transmitting the reception data 37.

If the reception data 37 is not received by the power receiving terminal 2, ("NO" in step ST17) its unicast data is to be transferred from a PLC device coupled to the uninterruptible power supply unit 1 to another PLC device not coupled thereto. In this case, the PLC transmitter 41 first checks if power failure detection is not in progress (step ST18). The PLC transmitter 41 may make such a check, depending on the situation in which the timer 35 is not measuring time for a backup power supply.

After the PLC transmitter 41 has checked that no power failure detection is in progress ("NO" in step ST18), it supplies the reception data 37 stored in the EEPROM 36 to the PLC modem device 32 corresponding to the power receiving terminal 2. The PLC modem device 32 corresponding to the power receiving terminal 2 modulates the reception data 37 to a unicast PLC signal whose destination is not specified and then superimposes (inputs) the PLC signal on the power line coupled to the power supply (step ST19). Thus, the PLC signal transmitted by the PLC device coupled to the uninterruptible power supply unit 1 is transferred to the power supply coupled to the uninterruptible power supply unit 1.

If power failure detection is in progress ("YES" in step ST18), the PLC transmitter 41 terminates the transfer process without providing a specific instruction for transmitting the reception data 37. Or if the PLC transmitter 41 determines that power failure detection is in progress, it may continue to determine whether power failure detection is in progress, and when the power failure detection has been terminated, the PLC transmitter 41 may provide an instruction for transmitting the reception data 37.

A case where the network address of the destination is registered in the shutdown sequence table 38 ("PRESENT IN TABLE" in step ST16) will now be described. In this case, unicast data is transferred to a PLC device coupled to the power supply terminal 3 having the outlet number corresponding to the network address.

The PLC transmitter 41 checks if the unicast data is transmissible to the transfer destination (step ST20). For example, The PLC transmitter 41 may make such a check depending on the situation in which the timer 35 has not measured time for a backup power supply equal to or longer than the wink time corresponding to the outlet number. Or the PLC transmitter 41 may make such a check depending on the situation in which the timer 35 is not measuring time for a backup power supply or whether the power supply controller 39 is providing a backup power or not.

If the PLC transmitter 41 determines that the unicast data is transmissible to the transfer destination ("YES" in step ST20), it reads the reception data 37 from the EEPROM 36 and supplies the read data to the PLC modem device 32 corresponding to the power supply terminal 3 coupled to the transfer destination. The PLC modem device 32 that has received the reception data 37 modulates the reception data 37 into a unicast PLC signal whose destination is specified and superimposes (inputs) the PLC signal on the power line (step ST21).

If the PLC transmitter 41 determines that the unicast data is not transmissible to the transfer destination ("NO" in step ST20), it terminates the transfer process without providing a specific instruction for transmitting the reception data 37. Or if the PLC transmitter 41 determines that the unicast data is not transmissible to the transfer destination, it may continue to determine whether the unicast data is transmissible to the transfer destination or not, and when the unicast data has become transmissible to the transfer destination, the PLC transmitter 41 may provide an instruction for transmitting the reception data 37.

Thus, if the uninterruptible power supply unit 1 receives a unicast PLC signal at the power receiving terminal 2 or any of the power supply terminals 3, the uninterruptible power supply unit 1 transfers the received PLC signal as a unicast PLC signal via the power supply terminal 3 to which the PLC device as the destination is coupled.

Figure 5:
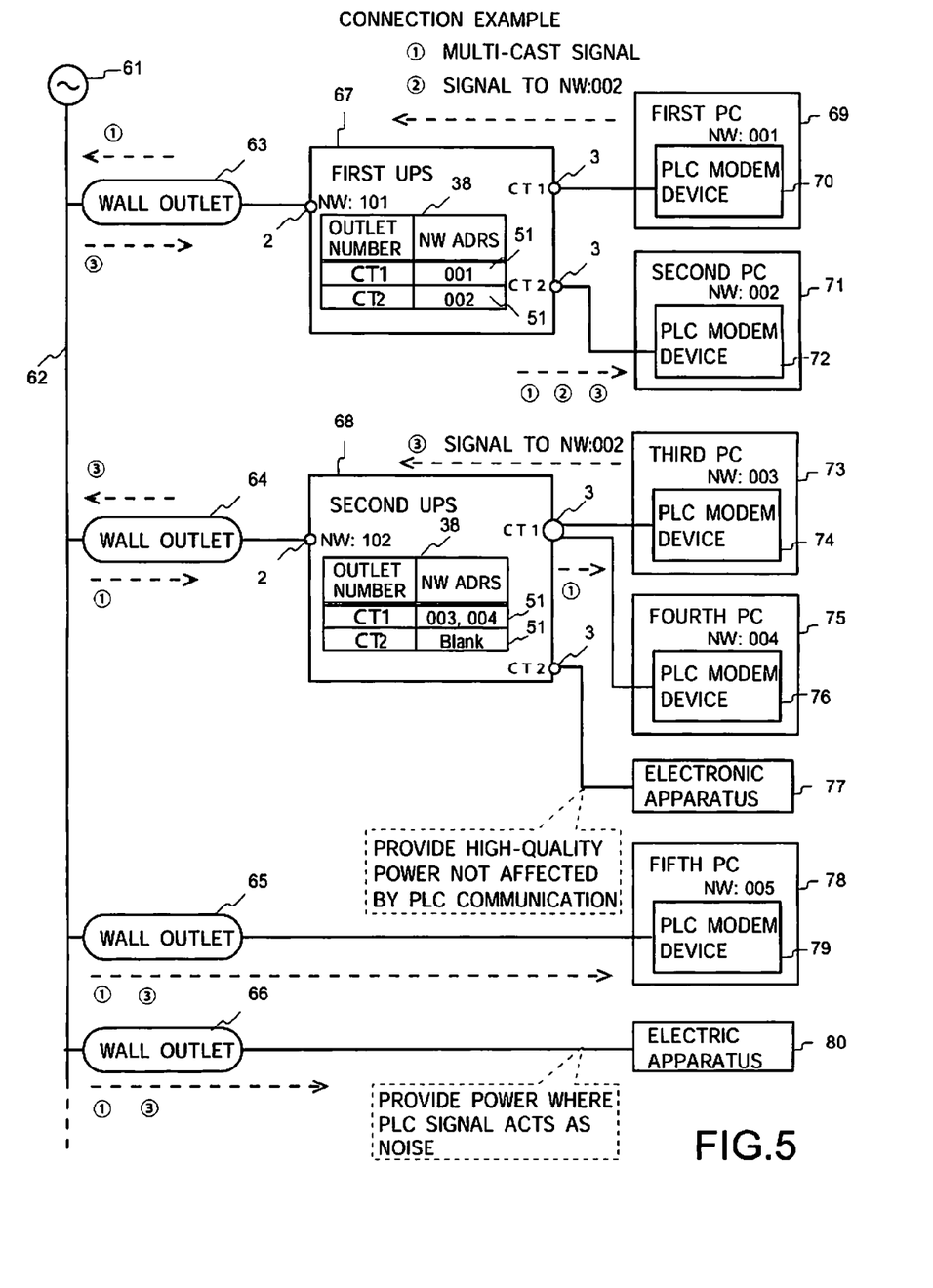
FIG. 5 is a diagram showing an example structure of a power line communication system using the uninterruptible power supply unit shown in FIG. 1.

FIG. 5 is a diagram showing a structural example of a power line communication system using the uninterruptible power supply unit 1 shown in FIG. 1. A commercial alternating current power supply 61 is coupled to four wall outlets 63 to 66 via a main power line 62 in this power line communication system. The two wall outlets 63 and 64 among these outlets are coupled to the power receiving terminal 2 of a first uninterruptible power supply unit (UPS) 67 and the power receiving terminal 2 of a second uninterruptible power supply unit (UPS) 68, respectively. The first UPS 67 and the second UPS 68 include the two power supply terminals 3, one having the CT1 and the other having the CT2.

The power supply terminal 3 having the CT1 of the first UPS 67 is coupled to a PLC modem device 70 (network address: 001) of a first PC 69 as a type of PLC device via a power supply cable. The power supply terminal 3 having the CT2 thereof is coupled to a PLC modem device 72 (network address: 002) of a second PC 71 as a type of PLC device via a power supply cable. The first and second PCs 69 and 71 operate by a power supplied from the first UPS 67. In this coupling example, a detection process by the power supply controller 39 of the first UPS 67 stores the network address "001" and network address "002" in the record 51 having the CT1 and the record 51 having the CT2, respectively, in the shutdown sequence table 38 of the first UPS 67.

The power supply terminal 3 having the CT1 of the second UPS 68 are coupled to a PLC modem device 74 (network address: 003) of a third PC 73 as a type of PLC device and a PLC modem device 76 (network address: 004) of a fourth PC 75 as a type of PLC device via two power supply cables. The power supply terminal 3 having the CT2 thereof is coupled to an electronic apparatus 77 having no power line communication function, such as a DVD player having a programmed recording function via a power supply cable. The third and fourth PCs 73 and 75 and the electronic apparatus 77 operate by a power supplied from the second UPS 68. In this coupling example, a detection process by the power supply controller 39 of the second UPS 68 stores the network addresses "003" and "004," and a network address "blank" in the record 51 having the CT1 and the record 51 having the CT2, respectively, in the shutdown sequence table 38 of the second UPS 68.

One (65) of the remaining wall outlets is coupled to a PLC modem device 79 (network address: 005) of a fifth PC 78 as a type of PC device via a power line. The other (66) of the remaining wall outlets via a power line is coupled to an electric apparatus 80 having no power line communication function, such as a refrigerator, a washing machine, or an air-conditioner. The fifth PC 78 and the electric apparatus 80 operate by a power supplied from the commercial alternating current power supply 61.

These PLC devices may each be a DVD player including a PLC modem device and having a programmed recording function or an air-conditioner including a PLC modem device.

In the power line communication system shown in FIG. 5, if multi-cast data is generated in the first PC 69, for example, the PLC modem device 70 of the first PC 69 modulates this multi-cast data to a PLC signal and transmits the modulated PLC signal to the first UPS 67. The PLC modem device 32 corresponding to the power supply terminal 3 having the CT1 of the first UPS 67 receives this PLC signal. Then the PLC receiver 40 of the first UPS 67 stores the received multi-cast data in the EEPROM 36. The PLC transmitter 41 of the first UPS 67 determines that this data is multi-cast data in step ST13 shown in FIG. 4. Then, the PLC transmitter 41 makes the PLC modem device 32 transmit this multi-cast PLC signal. The PLC modem device 32 corresponds to the power supply terminal 3 having the CT2 of which a network address is registered in the shutdown sequence table 38 as well as the power supply terminal 2 (step ST15 in FIG. 4). Thus, the multi-cast PLC signal generated in the PLC modem device 70 of the first PC 69 is transferred to the PLC modem device 72 of the second PC 71 and the main power line 62.

The main power line 62 is coupled to the second UPS 68 and the PLC modem device 79 of the fifth PC 78 via the wall outlets 63, 64, and 65. The PLC modem device 32 corresponding to the power receiving terminal 2 of the second UPS 68 receives this PLC signal. Then the PLC receiver 40 of the second UPS 68 stores the received multi-cast data in the EEPROM 36. The PLC transmitter 41 of the second UPS 68 determines that this data is multi-cast data in step ST13 shown in FIG. 4. Then, the PLC transmitter 41 transmits this multi-cast PLC signal by the PLC modem device 32 corresponding to the power supply terminal 3 having the CT1 whose network address is registered in the shutdown sequence table 38 (step ST15 in FIG. 4).

In the above-described multi-cast PLC signal transfer process performed by the first and second UPSs 67 and 68, the multi-cast PLC signal generated in the PLC modem device 70 of the first PC 69 is transferred to the PLC modem device 72 of the second PC 71, the PLC modem device 74 of the third PC 73, the PLC modem device 76 of the fourth PC 75, and the PLC modem device 79 of the fifth PC 78, as shown by characters "circled 1" in FIG. 5.

Also, if unicast data sent to the second PC 71 is generated in the first PC 69, the PLC modem device 70 of the first PC 69 modulates this unicast data to a PLC signal and transmits the modulated PLC signal to the first UPS 67. The PLC modem device 32 corresponding to the power supply terminal 3 having the CT1 of the first UPS 67 receives this PLC signal. Then the PLC receiver 40 of the first UPS 67 stores the received unicast data in the EEPROM 36. The PLC transmitter 41 of the first UPS 67 determines in step ST16 shown in FIG. 4 that the transfer destination is a PLC device on the power supply side, using the shutdown sequence table 38. Then, the PLC transmitter 41 makes the PLC modem device 32 transmit this unicast PLC signal. The PLC modem device 32 corresponds to the power supply terminal 3 having the CT2 in which the destination of the unicast data, "002", is registered as a network address (step ST21 in FIG. 4).

Thus, the unicast PLC signal generated in the PLC modem device 70 of the first PC 69 is transferred to the PLC modem device 72 of the second PC 71 in the routing process performed by the first UPS 67, as shown by a character "circled 2."

Also, for example, if unicast data sent to the second PC 71 is generated in the third PC 73, the PLC modem device 74 of the third PC 73 modulates this unicast data into a PLC signal and transmits the modulated PLC signal to the second UPS 68 or the like. The PLC modem device 32 corresponding to the power supply terminal 3 having the CT1 of the second UPS 68 receives this PLC signal. Then the PLC receiver 40 of the second UPS 68 stores the received unicast data in the EEPROM 36. The PLC transmitter 41 of the second UPS 68 determines that the transfer destination is a PLC device on the power reception side, using the shutdown sequence table 38 in step ST16 shown in FIG. 4. The PLC transmitter 41 also determines that the PLC signal has not been received from the power reception side in step ST17. Then, the PLC transmitter 41 transmits this unicast PLC signal from the PLC modem device 32 corresponding to the power receiving terminal 2 (step ST19 in FIG. 4). Thus, the unicast PLC signal generated in the PLC modem device 74 of the third PC 73 is transferred to the main power line 62.

The main power line 62 is coupled to the first UPS 67 and the PLC modem device 79 of the fifth PC 78 via the wall outlets 64 and 63. The PLC modem device 32 corresponding to the power receiving terminal 2 of the first UPS 67 receives the PLC signal on the main power line 62. Then the PLC receiver 40 of the first UPS 67 stores the received unicast data in the EEPROM 36. The PLC transmitter 41 of the first UPS 67 determines that the transfer destination is a PLC device on the power supply side, using the shutdown sequence table 38 in step ST16 shown in FIG. 4. Then, the PLC transmitter 41 of the first UPS 67 makes the PLC modem device 32 transmit this unicast PLC signal. The PLC modem device 32 corresponds to the power supply terminal 3 having the CT2 in which the destination of the unicast data "002", is registered as a network address (step ST21 in FIG. 4).

Thus, the unicast PLC signal generated in the PLC modem device 74 of the third PC 73 is transferred to the PLC modem device 72 of the second PC 71 in the routing processes performed by the second UPS 68 and first UPS 67, as shown by characters "circled 3" in FIG. 5.

Among the above-described PLC signals modulated from the three data, the PLC signals (the multi-cast PLC signal indicated by the characters "circled 1" and the unicast PLC signal indicated by the characters "circled 3" in FIG. 5) transferred to the main power line 62 are also transferred to the electric apparatus 80 as shown in FIG. 5.

The electric apparatus 80 includes a motor or the like and its electronic circuit is designed to be resistant to power supply noise. Thus, there is almost no possibility that the electric apparatus 80 may be malfunctioned by a power whose quality is degraded by a PLC signal.

However, the electronic apparatus 77 such as a DVD player having a programmed recording function is not always designed to be resistant to a power supply noise and may be malfunctioned by a power whose quality is degraded by a PLC signal. Specifically, such malfunctioning of the electronic apparatus 77 may lose programmed recording data or reset time of day set in its built-in timer.

In order to avoid this malfunctioning, the electronic apparatus 77 is coupled to the CT2 of the second UPS 68 in FIG. 5. "Blank" is registered in the CT2 in the shutdown sequence table 38 of the second UPS 68; supplying no PLC signal to the electronic apparatus 77. Hence, the electronic apparatus 77 receives a high-quality power whose quality is not degraded by a PLC signal.

Accordingly, coupling the electronic apparatus 77 to the power supply terminal 3 of the uninterruptible power supply unit 1 as described above further couples the electronic apparatus 77 to the power system for power line communication. This coupling can prevent the electronic apparatus 77 from malfunctioning even if the electronic apparatus 77 may be malfunctioned by a PLC signal when it is directly coupled to the main power line 62.

According to the uninterruptible power supply unit 1 of the exemplary embodiment, the multiple PLC modem devices 32 are installed as corresponding to the power receiving terminal 2 and multiple power supply terminals 3 in a one-to-one manner. The PLC receiver 40 and PLC transmitter 41 of the microcomputer 33 transmit communication data received from one of the PLC modem devices 32, from the PLC modem device 32 corresponding to a terminal to which a PLC device as the destination of the communication data is coupled. Hence, the uninterruptible power supply unit 1 can be coupled among the multiple PLC devices, transferring a PLC signal among the power receiving terminal 2 and multiple power supply terminals 3. Thus, these PLC devices can stably perform power line communication together via the uninterruptible power supply unit 1 without receiving any influences from the power supply state of the uninterruptible power supply unit 1 or the switching operation of the two input switch 15.

Also, the LPF circuit 7 or 18 for eliminating a PLC signal is coupled to the power line located between each PLC modem device 32 and power supply unit 10. Therefore, there is no possibility that a PLC signal transmitted to the power line by any of the PLC modem devices 32 may pass through the uninterruptible power supply unit and leak out from another terminal. In other words, a PLC signal is properly transferred among the power receiving terminal 2 and multiple power supply terminals 3 in the uninterruptible power supply unit 1.

Also, in this exemplary embodiment, the microcomputer 33 and multiple PLC modem devices 32 operate while being backed up by the battery 13 in the uninterruptible power supply unit 1. Therefore, the PLC receiver 40 and PLC transmitter 41 realized in the microcomputer 33 and the multiple PLC modem devices 32 operate and transmit or receive a PLC signal even when a backup power is being provided at the time of a power failure or the like.

Also, in this exemplary embodiment, the PLC modem device 32 corresponding to the power receiving terminal 2 transmits or receives a PLC signal between the surge absorber circuit 4 and power supply unit 10. Accordingly, the PLC modem device 32 corresponding to the power receiving terminal 2 is coupled to a power line located downstream of the surge absorber circuit 4 in the power supply direction so that the PLC modem device 32 is protected by the surge absorber circuit 4. Further, no PLC signal is eliminated by the surge absorber circuit 4; therefore, this PLC modem device 32 is allowed to transmit or receive a PLC signal to or from other PLC devices via the surge absorber circuit 4.

Also, each PLC modem device 32 according to this exemplary embodiment demodulates a received PLC signal into communication data, and modulates modules a received communication data into a PLC signal and transmits the modulated PLC signal. Also, the PLC transmitter 41 determines the destination of the reception data 37 (communication data demodulated by the PLC modem device 32) and supplies each communication data to the PLC modem device 32 corresponding to the destination. Thus, the PLC transmitter 41 properly transmits each PLC signal by performing the routing process for determining the destination.

Also, in this exemplary embodiment, the power supply controller 39 detects a PLC device coupled to each power supply terminal 3 in order to provide notification of shutdown and registers the network address of each detected PLC device in the shutdown sequence table 38. Also, the PLC transmitter 41 determines the destination of the reception data 37 using the shutdown sequence table 38. With regard to the reception data 37 of which destination is a network address that is not registered in the shutdown sequence table 38, the PLC transmitter 41 transmits the reception data 37 as a PLC signal from the PLC modem device 32 corresponding to the power receiving terminal 2 unless the reception data 37 has been received by the power receiving terminal 2. Thus, the PLC transmitter 41 properly performs the routing process without having to use a table other than the shutdown sequence table 38 or perform a detection process to create such another table.

Also, in this exemplary embodiment, after notification of shutdown has been applied, the PLC transmitter 41 transmits no PLC signal from the PLC modem device 32 corresponding to the power supply terminal 3 from which such notification has been applied. Therefore, the uninterruptible power supply unit 1 transmits no PLC signal to the PLC device undergoing a shutdown process. This prevents useless supply of backup power caused by transmitting a PLC signal to the PLC device undergoing a shutdown process.

Also, in this exemplary embodiment, the shutdown sequence table 38 includes the record 51 corresponding to each power supply terminal 3, and the network address of each PLC device is categorized and registered in this record 51 according to the coupling of the PLC device. Also, even if received communication data is multi-cast data whose destination is not specified, the PLC transmitter 41 transmits no PLC signal from a PLC modem device corresponding to a power supply terminal 3 with respect to which no network address is registered in the record 51 of the shutdown sequence table 38.

Therefore, if a device other than a PLC device, such as the electronic apparatus 77, is coupled to the power supply terminal 3 as shown in FIG. 5, a high-quality power on which no PLC signal is superimposed is supplied to the electronic apparatus 77. This allows the electronic apparatus 77, which may be malfunctioned by a PLC signal, to be coupled to the power system in which power line communication is performed.

While the above-described embodiment is a preferred embodiment of the present invention, the invention is not limited thereto. Various modifications and changes can be made thereto without departing from the spirit and scope of the invention.

In the above-described embodiment, the power supply unit 10 of the uninterruptible power supply unit 1 is allowed to provide power in any mode selected from constant inverter power supply mode and constant commercial mode. However, for example, the power supply unit 10 may provide power in only one of these modes.

If the power supply unit 10 operates in constant inverter power supply mode, power input from the power receiving terminal 2 is always supplied to the power supply via the battery 13 or the like. The battery 13 or the like serves to eliminate high-frequency components of a voltage. Thus, if the power supply unit 10 operates in constant inverter power supply mode as described above, no PLC signal passes through from the power receiving terminal 2 to the multiple power supply terminals 3 even if the power reception separating/mixing circuit 5 does not include the LPF circuit 7.

In the above-described embodiment, the network address of the PLC device coupled to each power supply terminal 3 is registered in the shutdown sequence table 38. However, the network address of the PLC device coupled to each power supply terminal 3 may be registered in a dedicated routing table other than the shutdown sequence table 38 along with the network address of the PLC device coupled to the power receiving terminal 2.

In the routing sequence (transfer sequence) shown in FIG. 4, if the reception data 37 is unicast data, the PLC transmitter 41 according to the above-described embodiment first determines whether the destination of the reception data 37 is registered (step ST16). Also, if the destination of the reception data 37 is not registered, the PLC transmitter 41 determines whether the reception data 37 has been received by the power receiving terminal 2 (step ST17). Thus, the PLC transmitter 41 determines whether the reception data 37 need be transferred and to which the reception data 37 should be transferred. However, the PLC transmitter 41 may first determine whether the reception data 37 has been received by the power receiving terminal 2 or by any power supply terminal 3. With regard to the reception data 37 received by the power receiving terminal 2, the PLC transmitter 41 may transmit the data to the multiple power supply terminals 3 in a transparent manner. With regard to the reception data 37 received by any power supply terminal 3, the PLC transmitter 41 may transmit the data to the other power receiving terminal 2 and the power supply terminals 3 in a transparent manner so that the data is transferred without specifically determining whether the reception data 37 need be transferred or not and to which the data should be transferred.

After the PLC transmitter 41 according to this exemplary embodiment has determined the transfer destination of the reception data 37 (steps ST13, ST16, and ST17 shown in FIG. 4), it checks if the power system of the transfer destination is in a transmittable state (steps ST14, ST20, and ST18 shown in FIG. 4) and provides an instruction for transmission (steps ST15, ST21, and ST19 shown in FIG. 4). However, after the PLC transmitter 41 has determined the transfer destination, it may immediately provide an instruction for transmission. Or, the PLC transmitter 41 may first check that the power system of the transfer destination is in a transmittable state, then determine the transfer destination of the reception data 37, and then provide an instruction for transmitting the data to the determined transfer destination.

Even if the reception data 37 is multi-cast data, the PLC transmitter 41 according to the above-described embodiment does not transmit the reception data 37 from the power supply terminal 3 having an outlet number with respect to which no network address is registered in the shutdown sequence table 38. That is, the PLC transmitter 41 does not transmit the reception data 37 from the power supply terminal 3 to which no PLC device is coupled. However, the PLC transmitter 41 may transmit multi-cast data or the like from all the power supply terminals 3 including the power supply terminal 3 to which no PLC device is coupled.

INDUSTRIAL APPLICABILITY

The present invention allows an uninterruptible power supply unit to be used in a manner that the unit is suitable for power line communication.

The invention claimed is:
1. An uninterruptible power supply unit comprising:
   a power supply circuit that generates a predetermined alternating current power from an alternating current power supplied to a power receiving terminal or from a backup power and supplies the generated power to one or more power supply terminals;

a plurality of modem means each installed corresponding to the power receiving terminal and each of the one or more power supply terminals in a one-to-one manner, and transmitting or receiving a power line communication (PLC) signal;

a plurality of low-pass filter circuits each coupled to a power line between each of the modem means and the power supply circuit, and eliminating the PLC signal; and a control means that makes at least one of the other modem means transmit a PLC signal, based on a PLC signal received by one of the modem means, wherein each of the modem means demodulates a received PLC signal into communication data, and modulates demodulated communication data into a PLC signal and transmits the modulated PLC signal; and the control means transmits communication data demodulated by the modem means to the modem means other than the modem means that has demodulated the communication data.

2. An uninterruptible power supply unit comprising:

a power supply circuit that generates a predetermined alternating current power from an alternating current power supplied to a power receiving terminal or from a backup power and supplies the generated power to one or more power supply terminals;

a plurality of modem means each installed corresponding to the power receiving terminal and each of the one or more power supply terminals in a one-to-one manner, and transmitting or receiving a power line communication (PLC) signal;

a plurality of low-pass filter circuits each coupled to a power line between each of the modem means and the power supply circuit, and eliminating the PLC signal; and a control means that makes at least one of the other modem means transmit a PLC signal, based on a PLC signal received by one of the modem means;

a routing table that stores a network address of a PLC device coupled to the uninterruptible power supply unit, wherein each of the modem means demodulates a received PLC signal into communication data, and modulates demodulated communication data into a PLC signal and transmits the modulated PLC signal, and the control means determines a destination of communication data demodulated by the modem means using the routing table and transmits the demodulated each communication data to the modem means corresponding to the destination so that the communication data is transmitted from the modem means corresponding to the destination.

3. An uninterruptible power supply unit comprising:

a power supply circuit that generates a predetermined alternating current power from an alternating current power supplied to a power receiving terminal or from a backup power and supplies the generated power to one or more power supply terminals;

a plurality of modem means each installed corresponding to the power receiving terminal and each of the one or more power supply terminals in a one-to-one manner, and transmitting or receiving a power line communication (PLC) signal;

a plurality of low-pass filter circuits each coupled to a power line between each of the modem means and the power supply circuit, and eliminating the PLC signal; and a control means that makes at least one of the other modem means transmit a PLC signal, based on a PLC signal received by one of the modem means;

detection means for detecting a PLC device coupled to each of the power supply terminals so as to make a notice of shutdown; and a shutdown sequence table being used to make a notice of shutdown and storing a network address of the PLC device detected by the detection means, wherein each of the modem means demodulates a received PLC signal into communication data, and modulates demodulated communication data to a PLC signal and transmits the modulated PLC signal, the control means determines a destination of communication data demodulated by the modem means using the shutdown sequence table, the communication data of which a destination is a network address registered in the shutdown sequence table is transmitted from the modem means corresponding to the determined destination, and the communication data of which a destination is a network address not registered in the shutdown sequence table is transmitted from the modem means corresponding to the power receiving terminal unless the communication data has been received by the power receiving terminal.

4. The uninterruptible power supply unit according to claim 3, wherein after a notice of shutdown has been made according to the shutdown sequence table, the control means controls the modem means corresponding to the power supply terminals from which the notice has been made to transmit no PLC signal.

5. The uninterruptible power supply unit according to claim 3, wherein the shutdown sequence table includes a record corresponding to each of the power supply terminals, and a network address of the PLC device is registered in the shutdown sequence table in a manner that the network address is classified depending on the record according to each coupling; and, even if the communication data is multi-cast data whose destination is not specified, the control means does not make the modem means transmit the communication data, the modem means being corresponding to the power supply terminals each of which no network address is registered in the record of the shutdown sequence table.

6. An uninterruptible power supply unit comprising:

a power supply circuit that charges a battery using alternating current power supplied to a power receiving terminal, converts a power contained in the battery into predetermined alternating current power using an inverter circuit, and supplies the converted power to a plurality of power supply terminals;

a plurality of modem means each installed corresponding to the power receiving terminal and the power supply terminals in a one-to-one manner, and transmitting or receiving a power line communication (PLC) signal;

a plurality of low-pass filter circuits each coupled to a power line between each of the modem means corresponding to the power supply terminals and the power supply circuit, and eliminating the PLC signal; and a control means that makes at least one of the other modem means transmit a PLC signal based on a PLC signal received by one of the modem means;

wherein each of the modem means demodulates a received PLC signal into communication data, and modulates demodulated communication data into a PLC signal and transmits the modulated PLC signal; and the control means transmits communication data demodulated by the modem means to the modem means other than the modem means that has demodulated the communication data.

7. An uninterruptible power supply unit comprising:

a power supply circuit that charges a battery using alternating current power supplied to a power receiving terminal, converts a power contained in the battery into predetermined alternating current power using an inverter circuit, and supplies the converted power to a plurality of power supply terminals;

a plurality of modem means each installed corresponding to the power receiving terminal and the power supply terminals in a one-to-one manner, and transmitting or receiving a power line communication (PLC) signal;

a plurality of low-pass filter circuits each coupled to a power line between each of the modem means corresponding to the power supply terminals and the power supply circuit, and eliminating the PLC signal; and a control means that makes at least one of the other modem means transmit a PLC signal based on a PLC signal received by one of the modem means;

a routing table that stores a network address of a PLC device coupled to the uninterruptible power supply unit, wherein each of the modem means demodulates a received PLC signal into communication data, and modulates demodulated communication data into a PLC signal and transmits the modulated PLC signal, and the control means determines a destination of communication data demodulated by the modem means using the routing table and transmits the demodulated each communication data to the modem means corresponding to the destination so that the communication data is transmitted from the modem means corresponding to the destination.

8. An uninterruptible power supply unit comprising:

a power supply circuit that charges a battery using alternating current power supplied to a power receiving terminal, converts a power contained in the battery into predetermined alternating current power using an inverter circuit, and supplies the converted power to a plurality of power supply terminals;

a plurality of modem means each installed corresponding to the power receiving terminal and the power supply terminals in a one-to-one manner, and transmitting or receiving a power line communication (PLC) signal;

a plurality of low-pass filter circuits each coupled to a power line between each of the modem means corresponding to the power supply terminals and the power supply circuit, and eliminating the PLC signal; and a control means that makes at least one of the other modem means transmit a PLC signal based on a PLC signal received by one of the modem means;

detection means for detecting a PLC device coupled to each of the power supply terminals so as to make a notice of shutdown; and a shutdown sequence table being used to make a notice of shutdown and storing a network address of the PLC device detected by the detection means, wherein each of the modem means demodulates a received PLC signal into communication data, and modulates demodulated communication data to a PLC signal and transmits the modulated PLC signal, the control means determines a destination of communication data demodulated by the modem means using the shutdown sequence table, the communication data of which a destination is a network address registered in the shutdown sequence table is transmitted from the modem means corresponding to the determined destination, and the communication data of which a destination is a network address not registered in the shutdown sequence table is transmitted from the modem means corresponding to the power receiving terminal unless the communication data has been received by the power receiving terminal.

9. The uninterruptible power supply unit according to claim 8, wherein after a notice of shutdown has been made according to the shutdown sequence table, the control means controls the modem means corresponding to the power supply terminals from which the notice has been made to transmit no PLC signal.

10. The uninterruptible power supply unit according to claim 8, wherein the shutdown sequence table includes a record corresponding to each of the power supply terminals, and a network address of the PLC device is registered in the shutdown sequence table in a manner that the network address is classified depending on the record according to each coupling; and, even if the communication data is multi-cast data whose destination is not specified, the control means does not make the modem means transmit the communication data, the modem means being corresponding to the power supply terminals each of which no network address is registered in the record of the shutdown sequence table.

* * * * *

UNITED STATES PATENT AND TRADEMARK OFFICE
CERTIFICATE OF CORRECTION

PATENT NO.        : 8,138,910 B2
APPLICATION NO.   : 12/299251
DATED             : March 20, 2012
INVENTOR(S)       : Kazuhiro Iwai It is certified that error appears in the above-identified patent and that said Letters Patent is hereby corrected as shown below:

On the title page item (73), changing 'Densei-Lambda K.K.' to 'Fuji Electric Co., Ltd.'.

Signed and Sealed this
Twenty-first Day of August, 2012

David J. Kappos
*Director of the United States Patent and Trademark Office*